April 21, 1931.  H. M. ROCKWELL  1,801,287
INTERNAL COMBUSTION ENGINE
Filed July 29, 1925   2 Sheets-Sheet 1
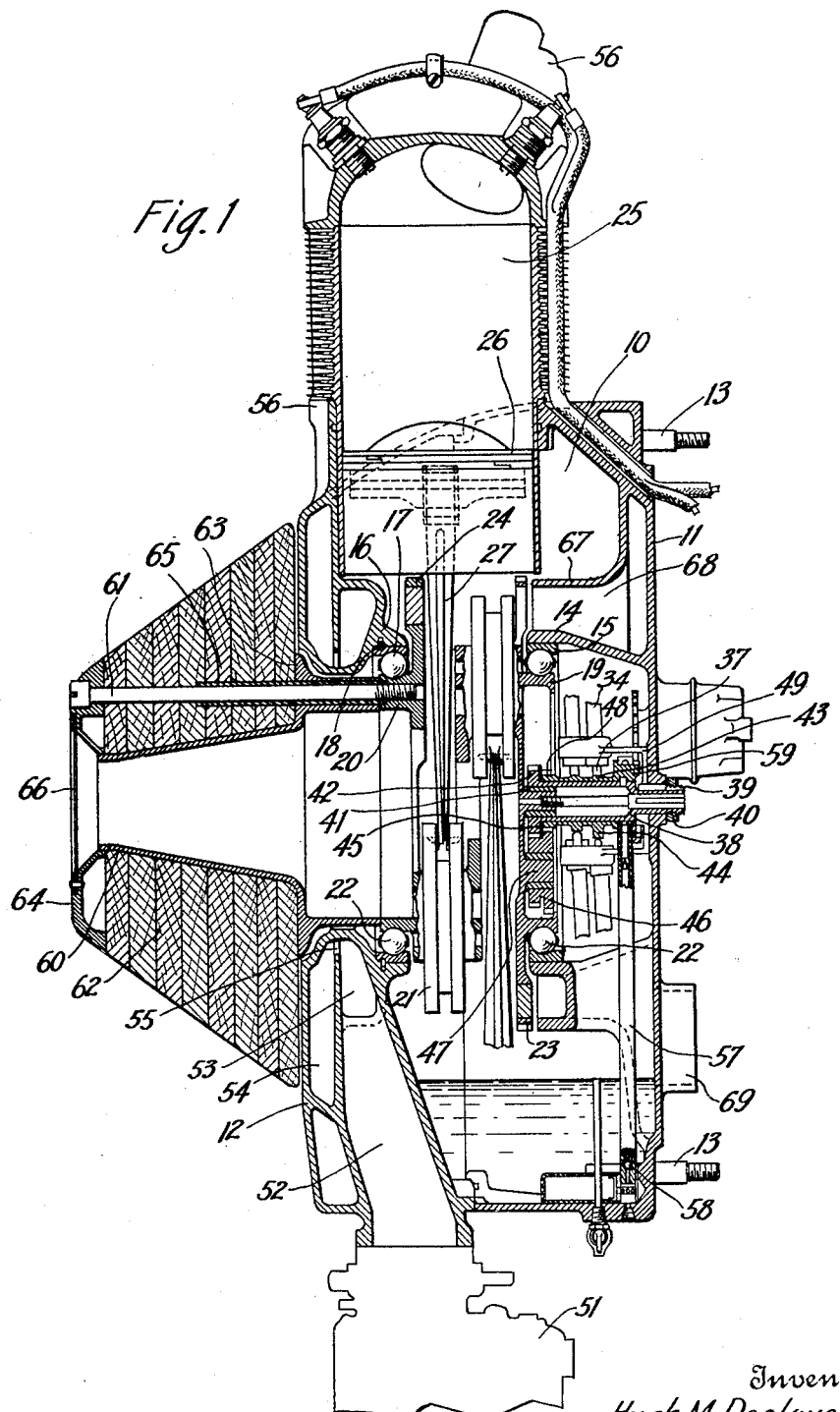
Inventor
Hugh M. Rockwell,
By his Attorney

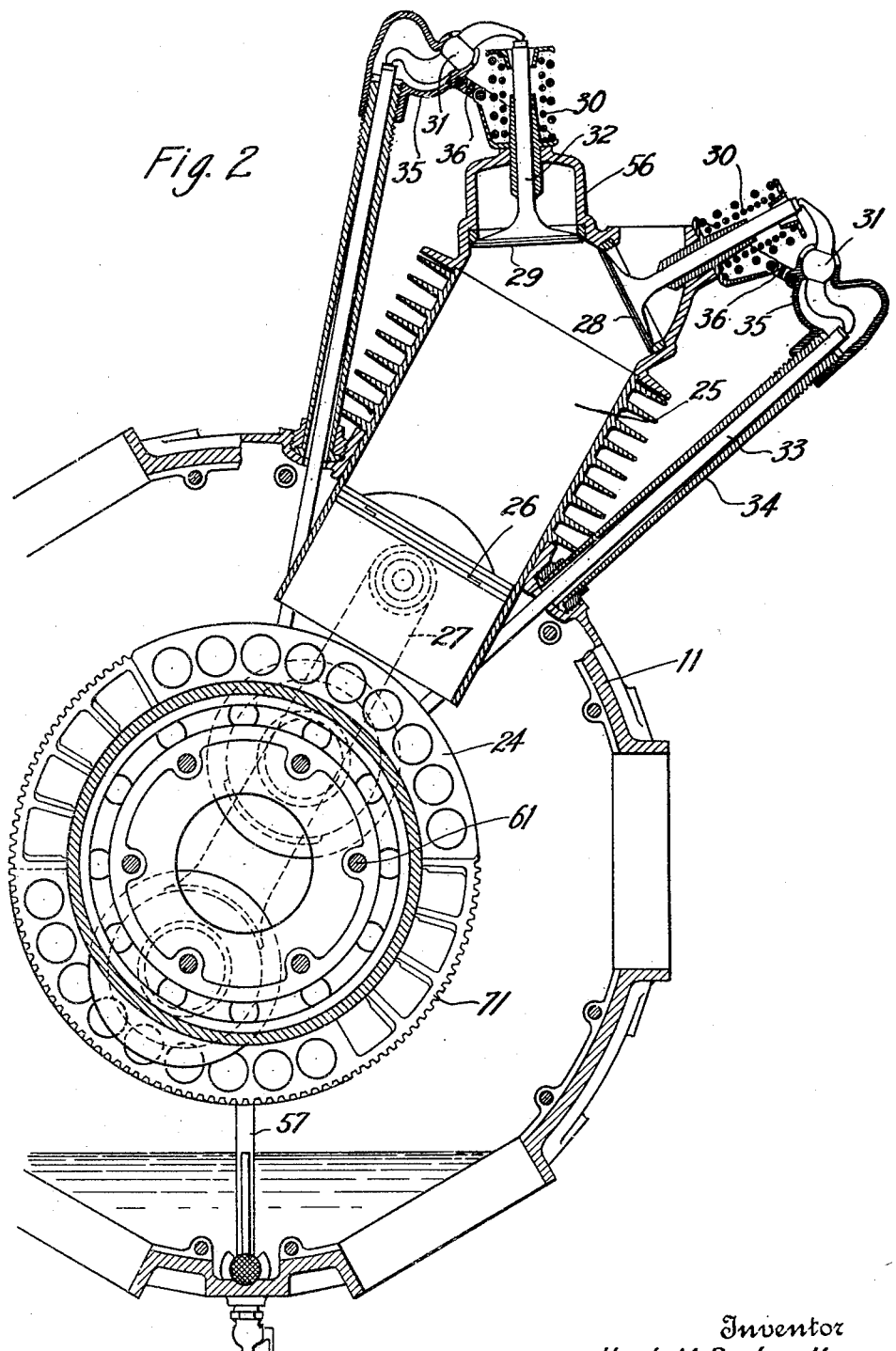

Patented Apr. 21, 1931

1,801,287

UNITED STATES PATENT OFFICE

HUGH M. ROCKWELL, OF ELMHURST, NEW YORK

INTERNAL-COMBUSTION ENGINE

Application filed July 29, 1925. Serial No. 46,335.

This invention relates to internal combustion engines and more particularly to a light weight, highly efficient engine for airplanes.

According to the invention, the engine housing or crank case is tapered axially in stream line configuration and is connected to the fuselage to form the front end thereof. The propeller hub, which is connected directly to the crank shaft of the engine is also of stream line conformation as is the propeller cap. Thus, all the parts blend into a continuous curve. The propeller hub is made hollow to form an air passage into the crank case to assist in cooling the engine.

The invention may be better understood by having reference to the accompanying drawings wherein Fig. 1 is a vertical section axially through the engine and Fig. 2 is a vertical section at right angles to Fig. 1.

The crank case 10, which is composed of the two parts 11 and 12, is of substantially fustro-conical or stream line configuration and is adapted to be attached to the front end of a fuselage to form the nose thereof by means of bolts 13 which also hold together the parts 11 and 12.

Projecting from the rear wall of part 11 is an annular housing 14 in which is mounted a ball race 15. A similar housing 16 projects from the front wall of part 12 and a ball race 17 is mounted thereon, the ball race being locked in position by a snap ring 18 seated in alined grooves in the race and housing. The hubs 19 and 20 of a crank shaft 21 project into the races 15 and 17, respectively, and are rotatably mounted therein by means of balls 22 arranged in grooves in the hubs opposite grooves in the races. The diameter of the ball groove in the hubs is larger than the throw of the crank shaft 21.

A counter weighted plate 23 is attached to the rear hub 19 of the crank shaft, and a counter weighted sector 24 is attached to the front hub 20.

A plurality of cylinders 25 are mounted on the crank case around the periphery thereof and project therein. In the embodiment disclosed, six cylinders are provided although any number desired may be used. For simplicity, only one cylinder is shown in detail.

In each of these cylinders is mounted a piston 26 which is connected to a crank arm of the shaft by a pitman 27.

In the outer end of each cylinder is an inlet port and an outlet port controlled by the valves 28 and 29, respectively. Springs 30 normally hold closed the valves which are opened by means of the rocker arms 31, one end of which bears against the valve stem 32 and the other end of which contacts with the end of a tappet rod 33. A tube 34 surrounds each tappet rod and is supported at one end from the engine casing. A housing 35 is carried by the other end of the tube 34 and is connected to the end of the cylinder by a link 36. The rocker arm 31 is mounted in this housing which serves as a fulcrum therefor. The ends of the tube 34 are threaded so that the position of the housing 35 may be adjusted to obtain proper relationship of the rocker arm and tappet rod. At the end of each tappet rod is mounted a roller 37 to engage a cam to be later described.

A hollow shaft 38 projects from the rear wall of the casing 11 to which it is attached by means of a threaded portion 39 passing through the wall and a nut 40 engaging the threaded portion. A stud shaft 41 on the crank shaft seats in the inner end of the shaft 38.

On the inner end of the shaft 38 is an integral pinion 42. Rotatably mounted on the shaft 38 is a sleeve 43 provided with cams 44 against which bear the tappet rod rollers 37. A washer 45 is interposed between pinion 42 and the end of sleeve 43 to space them properly. The cam sleeve 43 is actuated through the medium of a planetary gearing comprising the pinion 42 on the shaft 38 and a double pinion 46 rotatably mounted on a stud shaft 47 projecting from the plate 23, the teeth of the smaller pinion meshing with pinion 42 and the teeth of the larger pinion meshing with a pinion 48 formed on the inner end of the cam sleeve. The shaft 38 clamps against the rear wall of the casing 12, a substantially cup-shaped member 49 in which are provided a plurality of apertures to serve as tappet rod guides.

A carburetor 51 is attached to the crank case 10 in communication with a port 52 leading into an annular chamber 53. A second annular chamber 54 communicates with chamber 53 through an annular port 55. From the chamber 54, a conduit 56 leads to the inlet port of each cylinder.

An oil pump is provided which comprises a tubular member 57 extending to the bottom of the casing which is reciprocated through the medium of an eccentric 59 on the cam sleeve 43. In the tube 57 is provided a check valve comprising a ball 58 on the lower end of a rod slidably mounted in the tube. This pump forces oil up to the various parts of the engine.

The propeller shaft 60 is tubular and abuts against the forward hub 20 of the crank shaft 21 to which it is attached by means of bolts 61, only one of which is shown in the drawings. Preferably, the shaft 60 is tapered and the propeller 62 fits over it, the rear face of the propeller hub contacting with an annular shoulder 63 on the shaft. The propeller is preferably of the laminated type and the hub is tapered to form a stream line configuration with the crank case. A hollow cap 64 fits over the outer end of the propeller shaft and bears against the front face of the propeller hub. This cap is clamped against the hub by the bolts 61 which pass through the latter and are screwed into the front end of the crank shaft. Bushings 65 surrounding the bolts 61 take the driving thrust. In the cap is provided a screen 66. An annular wall 67 projects forwardly from the rear wall 11 of the crank case 10 to form with the casing 16 an air chamber 68 having an outlet 69. The outer wall of the chamber 68 is substantially coextensive with the plate 23 and the latter is provided with a number of apertures 70, the edges of which are shaped to form fan blades. Air is admitted to the crank case through the propeller shaft, circulated through the crank case, is driven into chamber 68 by the fan blades and is exhausted through the aperture 69. This arrangement provides a highly efficient way of internally cooling the engine.

The plate 23 may be provided with teeth 71 to mesh with the pinion of a starting motor which may be of any suitable type and mounted on the crank case in any convenient manner.

What is claimed is:

1. In combination, an airplane engine comprising a casing, a crank shaft mounted therein, a propeller shaft carried by said crank shaft and extending through an aperture in said casing, said propeller shaft being hollow to admit a current of air therethrough to the interior of said casing, a fan connected to said crank shaft, an annular chamber in the rear wall of said casing in alinement with the blades of said fan, and an outlet port from said chamber.

2. An airplane engine comprising a casing having an aperture in its front wall, a crank shaft in said casing in alinement with said aperture, a hollow propeller shaft carried by said crank shaft and projecting through said aperture, a screen mounted in said propeller shaft, and a fan carried by said crank shaft within said casing.

3. An airplane engine comprising a casing having an aperture, a crank shaft mounted in said casing in alinement with said aperture, a propeller shaft extending through said aperture, a propeller on said shaft and bolts passing through said propeller and shaft and into the end of said crank shaft to attach said propeller and propeller shaft thereto.

4. An airplane engine comprising a casing, a crank shaft mounted therein, means to admit a current of air to said casing, a fan carried by said crank shaft and arranged within said casing, and an outlet port in said casing.

5. An airplane engine comprising a casing, a crank shaft mounted therein, means to admit a current of air to said casing, a fan carried by said crank shaft, an annular chamber in the rear wall of said casing in alinement with the blades of said fan, and an outlet port from said chamber.

6. An airplane engine comprising a casing, a crank shaft mounted therein, means to admit a current of air to said casing, a plate carried by said crank shaft, said plate having a series of apertures near its periphery forming fan blades, an annular chamber in said casing having an opening substantially in alinement with said fan blades, and an outlet port from said chamber.

In testimony whereof I hereunto affix my signature this 24th day of July, 1925.

HUGH M. ROCKWELL.